(12) United States Patent
Sasagawa (10) Patent No.: US 6,704,506 B2
(45) Date of Patent: Mar. 9, 2004

(54) ILLUMINANT-EQUIPPED CAMERA (75) Inventor: Mikio Sasagawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/355,031

(22) Filed: Jan. 31, 2003

(65) Prior Publication Data

US 2003/0147637 A1 Aug. 7, 2003

(30) Foreign Application Priority Data

Feb. 1, 2002 (JP) .................................... 2002-025608

(51) Int. Cl.$^7$ ............................................... G03B 17/18
(52) U.S. Cl. ................... 396/88; 396/106; 396/109; 396/279; 396/286; 396/287; 396/290; 396/312; 396/448; 396/535; 396/543; 348/240.99; 348/333.02; 348/333.04; 348/372; 348/373
(58) Field of Search .................. 396/88, 106, 109, 396/281, 286, 287, 312, 448, 535, 543; 348/207.99, 240.99, 333.02, 333.04, 372, 373

(56) References Cited

U.S. PATENT DOCUMENTS

| | | | | |
|---|---|---|---|---|
| 4,106,037 A | * | 8/1978 | Nakamura et al. | 396/178 |
| 4,363,546 A | * | 12/1982 | Enomoto et al. | 396/144 |
| 4,908,649 A | * | 3/1990 | Matsui et al. | 396/110 |
| 5,870,637 A | * | 2/1999 | Sensui | 396/109 |
| 6,442,348 B1 | * | 8/2002 | Yamada | 396/281 |
| 2003/0165337 A1 | * | 9/2003 | Inazuka et al. | 396/448 |

FOREIGN PATENT DOCUMENTS

| | | | | |
|---|---|---|---|---|
| JP | 3123544 B2 | 10/2000 | ........... | G03B/17/02 |
| JP | 2000-321641 A | 11/2000 | ........... | G03B/17/02 |

\* cited by examiner

*Primary Examiner*—W. B. Perkey
(74) *Attorney, Agent, or Firm*—Birch, Stewart, Kolasch & Birch, LLP (57) ABSTRACT

A movable power switch member mounted on the front face of a camera body is provided with a luminous display unit comprising any number (preferably a plurality) of illuminants, and light emission is so controlled as to realize different forms of displaying according to the operating state of the camera. For instance, the lighting, either continuous or intermittent, of the illuminants is controlled according to the remaining charge or the progress of charging of the battery. There are available a mode in which the luminous display unit is also used as a battery indicator, another mode in which the state of light is altered according to the initial mode (at the time of turning on power supply), still another mode in which the illuminants are used as a substitute for a tally lamp at the time of self-timed shooting and yet others, resulting in the achievement of an illumination effect in addition to the displaying of the operating state. Thus, a camera excelling in visual perceptibility and aesthetic feature enabling ready distinction of its different states of operation is provided.

16 Claims, 6 Drawing Sheets

ILLUMINANT-EQUIPPED CAMERA

BACKGROUND OF THE INVENTION

1. Field of the Invention

The present invention relates to a camera, and more particularly to an illuminant-equipped camera on the front face of which is formed a display unit using an illuminant or illuminants, such as light emitting diodes (LEDs).

2. Description of the Related Art

An illuminant-equipped still camera using a silver halide film is disclosed in Japanese Patent No. 3123544. This still camera has on the front face of its body a luminous display unit including a plurality of illuminants, which are lit when a power switch is turned on and then intermittently turn on and off in such a manner as if a displayed pattern were rotating.

However, the conventional still camera disclosed in the patent cited above requires a space for accommodating the illuminants within the camera body because the illuminants are directly built into the camera. Moreover, in this conventional still camera, the luminous display unit is operated only when the power switch is on, but is not operated when the power switch is off. Thus, the patent cited above contains no mention of any other mode of utilizing the luminous display unit.

Furthermore, mobile electronic devices, such as digital cameras, nowadays are required to be aesthetically attractive, too.

SUMMARY OF THE INVENTION

An object of the present invention, attempted in view of these circumstances, is to provide an illuminant-equipped camera which can enhance the efficiency of space utilization within the camera body, enables the user to visually keep track with ease the operating states of the camera and is aesthetically attractive as well.

In order to attain the above-mentioned object, the present invention is directed to an illuminant-equipped camera provided on a front face of its body with a movable power switch unit, wherein the power switch unit has a luminous display unit comprising at least one illuminant, and light emission from the illuminant is controlled according to a state of the camera.

According to the present invention, an illuminant or illuminants are arranged on the movable power switch unit itself, which functions as the operating unit for the power switch, and light emission is controlled so as to manifest display forms differing with the operating state of the camera, thereby enabling the user to easily identify the operating state of the camera from the display on the luminous display unit.

The invention can also provide a camera excelling in design by virtue of the illumination effect of the luminous display unit. Thus, by varying in many ways the display for of the luminous display unit according to the operating state of the camera, it is possible to give an impression as if the camera itself were varying its expression by its own will, and thereby to differentiate the camera from conventional competing products in aesthetic attractiveness and uniqueness among other respects.

In one mode of implementing the invention, the luminous display unit comprises a plurality of illuminants, and a control circuit effecting light emission control over the illuminants controls a number of lit ones among the plurality of illuminants according to at least one of remaining charge and a state of charge of a power source battery of the camera.

Using the plurality of illuminants provided on the front face of the camera as an of the remaining charge or the state of charge of the power source battery of the camera enables the user to readily keep track of the state of the battery.

According to another mode of implementing the invention, the power switch unit is also used as the grip or the lens barrier of the camera.

The configuration in which the movable power switch unit to function as the grip or the lens barrier is fitted to the front face of the camera and the illuminants are provided on this movable switch unit itself makes the arrangement of the illuminants easier than in a structure in which the illuminants are accommodated within the camera body, resulting in more efficient utilization of the space within the camera body.

Furthermore, the unexpectedness of light emission from the movable power switch unit itself can visually amuse the user.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 illustrates a front view of the camera shown in FIG. 1 when power supply is on;

FIG. 8 illustrates a front view of the camera shown in FIG. 7 when power supply is on.

DETAILED DESCRIPTION OF THE PREFERRED EMBODIMENTS

Illuminant-equipped cameras, which are preferred embodiments of the present invention, will be described in detail with reference to the accompanying drawings.

Figure 1:
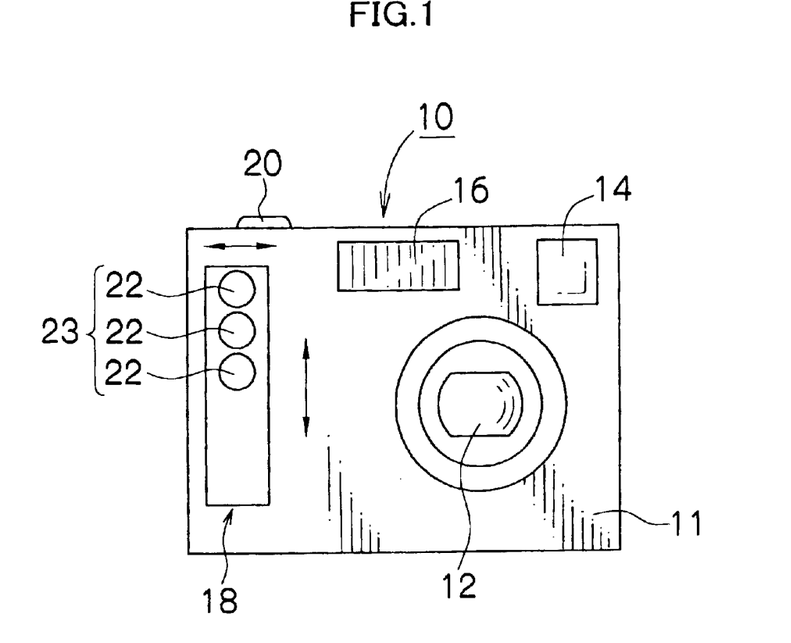
FIG. 1 illustrates a front view of an illuminant-equipped camera in a mode of implementing the present invention.

FIG. 1 illustrates a front view of an illuminant-equipped camera in a mode of implementing the present invention. A camera 10 illustrated therein is a digital camera, which converts an optical image of the object into digital image data and records the converted data on a recording medium. It is provided on the front face of a camera body 11 with an image pickup lens 12, a view finder window 14, an electric flash unit 16 and a power switch member 18, and on the top face of the body with a shutter release button 20.

The power switch member 18 is a member which is also used as a grip to enable the camera 10 to be held more firmly, and can be shifted either horizontally or vertically in FIG. 1. By sliding the power switch member 18, power supply can be turned on or off. Incidentally, the structure for moving the power switch member 18 is not limited to one for horizontal or vertical sliding, but may be one for pushing in the directions vertical to the sheet face of FIG. 1 or a rotational one (the angle of rotation may be restricted).

A plurality of illuminants 22 are embedded in the power switch member 18. As the illuminants 22, such light emitting devices as LEDs or lamps can be used. Although a luminous display unit 23 having a configuration in which three illuminants 22 are arranged in the longitudinal direction of the camera 10 is shown for this embodiment, the number and the form of arrangement of the illuminants 22 constituting the luminous display unit 23 are not limited those shown in FIG. 1, but any desired number of illuminants 22 can be arranged in any desired form. By varying the ways in which the individual illuminants 22 are turned on and off, lit intermittently, the intervals of intermittent lighting, the colors and the brightness (luminance) in which they are lit, and the combination of these factors, many different display patterns can be realized.

Figure 2:
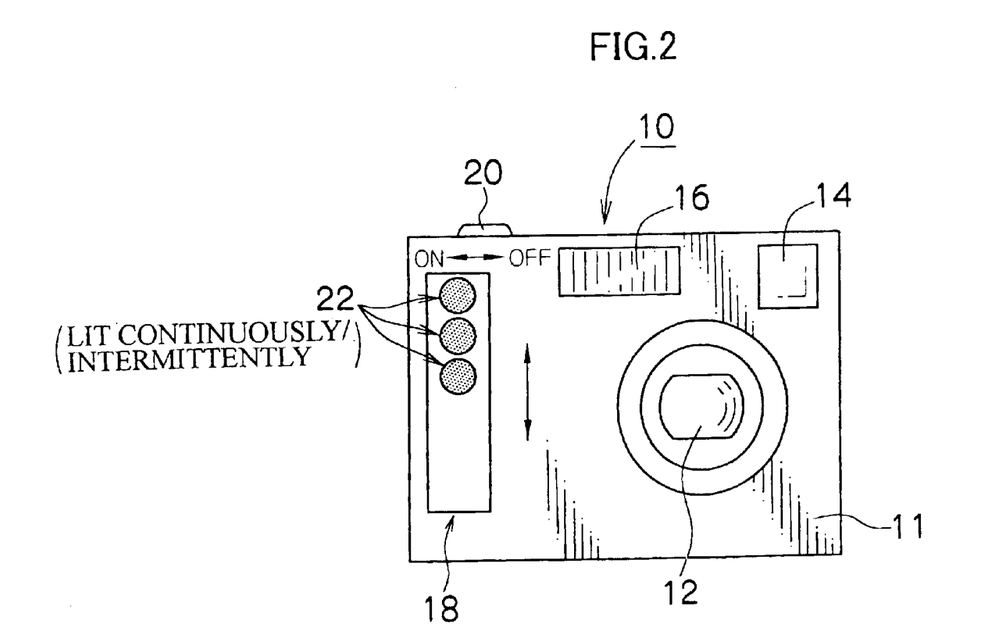

In the state shown in FIG. 1 wherein power supply is off, all the illuminants 22 are off. If the power switch member 18 has a structure for horizontal sliding, when the power switch member 18 is slid laterally and stopped in the position where power supply is on as shown in FIG. 2, the camera 10 will be supplied with power and the illuminants 22 will be lit either continuously or intermittently.

Figure 3:
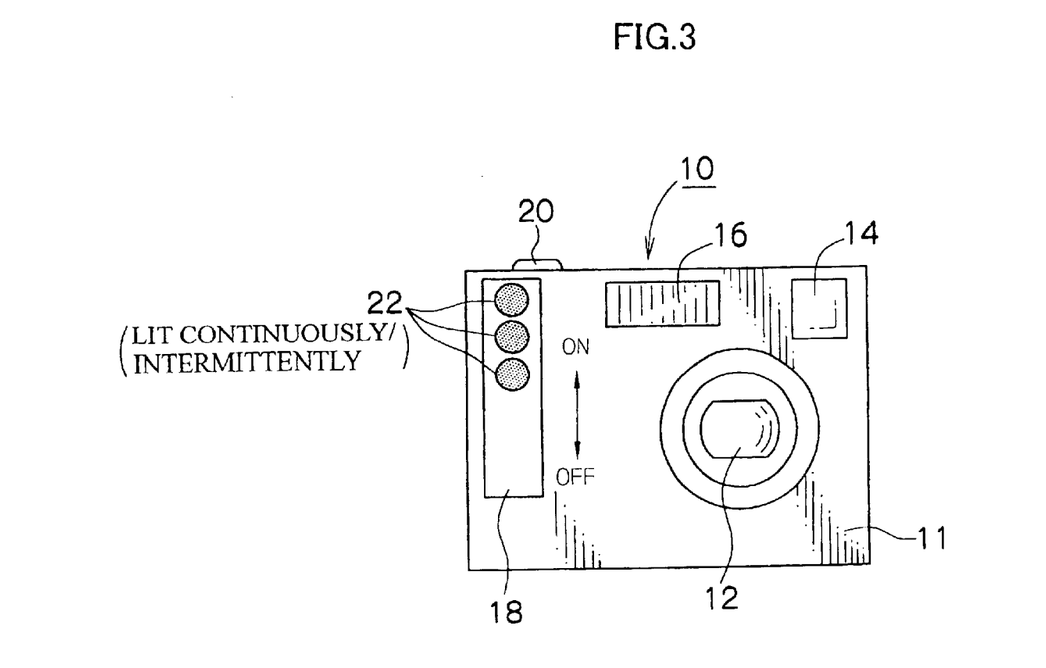
FIG. 3 illustrates a front view of the camera when power supply is on where the power switch member shown in FIG. 1 is so structured as to shift vertically.

Or if the power switch member 18 has a structure for vertical sliding, when the power switch member 18 is slid up or down and stopped in the position where power supply is on as shown in FIG. 3, the camera 10 will be supplied with power and the illuminants 22 will be lit either continuously or intermittently.

Figure 4:
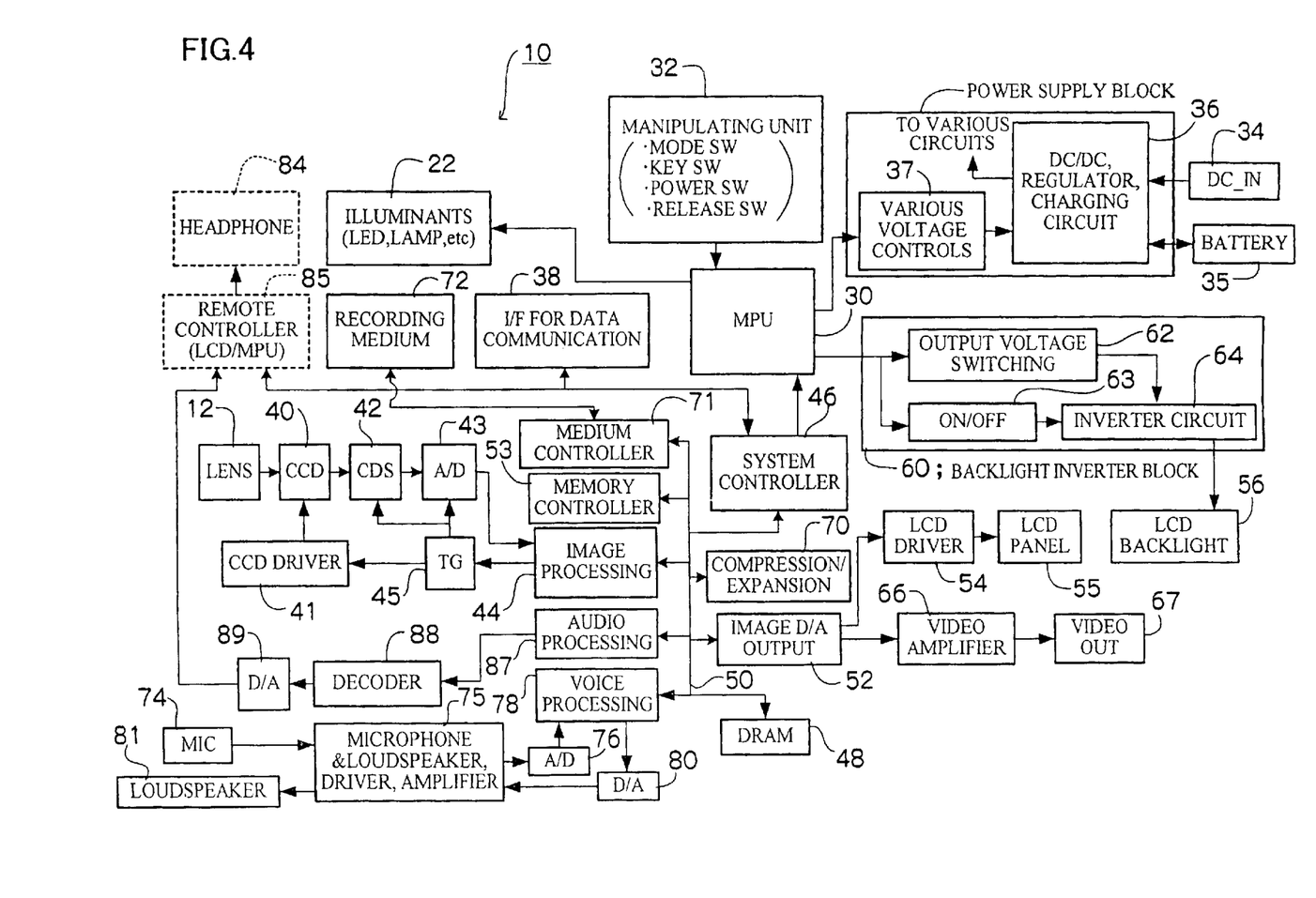
FIG. 4 is a block diagram illustrating the internal configuration of this example of camera.

FIG. 4 is a block diagram illustrating the internal configuration of the camera 10. Incidentally, although the embodiment to be further described herein is a multifunctional camera which can record and play back not only still images but also sound moving pictures, audio contents and voices, implementation of the invention does not necessarily require the presence of all these functions.

Referring to FIG. 4, a microprocessing unit (MPU) 30 is a control unit which exercises overall control on this camera system in accordance with a prescribed program. It controls the operations of circuits in the camera 10 on the basis of instruction signals from a manipulating unit 32. To add, the MPU 30 is provided with a read only memory (ROM) (not shown) in which the control program and various data are stored and a random access memory (RAM) (not shown) to be used as a work area for various kinds of arithmetic processing.

The manipulating unit 32 is a device for the user to input various instructions to the camera 10, and contains a variety of manipulating means including a mode selector switch for selecting the operating mode of the camera 10; a menu key for instructing the displaying of a menu screen; a cross-shaped key for inputting an instruction to select a desired item in the menu (moving the cursor), to move the played-back image forward or backward frame by frame or the like; an enter key for instructing finalizing (registering the selected item or the execution of an action; key switches such as a cancel key for deleting the selected item or any previously desired object or canceling an instruction; a power switch; a zooming switch and a shutter release switch.

Power is supplied to the camera 10 from an external power source or a battery 35 connected to a DC input terminal (DC-IN) 34. As the battery 35, a secondary battery can be used. Power from the DC input terminal 34 or the battery 35, after being converted by a power supply circuit 36 comprising a DC/DC converter and a regulator into required voltages, is supplied to various constituent circuits.

The power supply circuit 36 is also equipped with a voltage detecting circuit which functions as a remaining charge detecting device for the battery 35 and a charger circuit for charging the battery 35. The MPU 30 sends commands to a voltage control unit 37 to effect controls, including charge control, over the power supply circuit 36 and acquires from the power supply circuit 36 various items of information needed for the controls, such as the type of power source used and the battery voltage.

The MPU 30 judges the state of the camera 10 according to signals sent from the power supply circuit 36 and other internal circuits and input signals or the like from the manipulating unit 32, and controls light emission by the illuminants 22 according to the judged states. More particulars of the control of light emission will be described afterwards.

The camera 10 further has an interfacing unit 38 for data communication as a device for transmitting and receiving data to and from external units including a personal computer (PC) (not shown). The usable communication system is not limited, and may be any appropriate system such as USB, IEEE 1394, Bluetooth or the like.

To describe the photographic functions of the camera 10, a light having passed the image pickup lens 12 is brought to incidence on a CCD solid imaging element (hereinafter abbreviated to CCD) 40. On the light receiving face of the CCD 40, many photosensors are arranged two-dimensionally, and is provided with the Bayer format of some other prescribed color filter arrangement structure. Instead of the CCD 40, a CMOS image sensor or some other image pickup device may be used as well.

The optical image of the object formed on the light receiving face of the CCD 40 via the image pickup lens 12 is converted into is converted by each photosensor into signal charges in a quantity matching the incident luminous energy. The signal charges accumulated in the photosensors are read into a shift register in response to a read gate pulse applied from a CCD driver 41, and successively read out in response to a register transfer pulse as voltage signals, each matching a signal charge.

The CCD 40 has a so-called electronic shutter function by which the duration of charge accumulation by the photosensors (shutter speed) is controlled according to the timing of a shutter gate pulse. The CCD 40 has a function, when reading signal charges out of photosensors on the light receiving face, to thin them out in the vertical direction. It is so controlled as to thin out in the vertical direction when recording moving pictures and reading the data of all the pixels, without thinning out, when recording still pictures (in high pixel reading).

Signals supplied from the CCD 40 are sent to an analog processing unit 42, converted into digital signals by an A/D converter 43 after going through required processing including correlated double sampling (CDS), color separation and gain adjustment, and sent to an image processing unit 44. A timing generator (TG) 45 provides timing signals for synchronous driving to the CCD driver 41, the analog processing unit 42 and the A/D converter 43 at the instruction of the MPU 30, and these timing signals serve to synchronize the operations of these circuits.

The image processing unit 44, which is a picture signal processing device comprising a luminance and color difference signal generating circuit, a gamma correcting circuit, a contour correcting circuit and a white balance correcting circuit, processes picture signals in accordance with commands given by a system controller 46. Image data entered into the image processing unit 44 are converted into luminance signals (Y signals) and color difference signals (Cr and Cb signals) and, after going through prescribed processing including gamma correction, are stored into a dynamic RAM (DRAM) 48.

When a picked-up image is to be supplied for monitoring, image data are read out of the DRAM 48, and transferred to an image output processing unit 52 via a bus 50. Data transfers to and from the DRAM 48 are controlled by a memory controller 53.

Data delivered to the image output processing unit 52 are converted into signals for displaying of a prescribed system (e.g., color composite video signals of the NTSC system) and go through D/A conversion into signals in an analog form. The signals for displaying generated by the image output processing unit 52 are delivered to a liquid crystal display (LCD) driver 54 and, after going through required signal conversion, supplied to an LCD panel 55. In this way, image contents are displayed on the LCD panel 55.

Periodic rewriting of image data supplied from in the DRAM 48 by image signals supplied from the CCD 40 and the supplying of picture signals generated from the image data to the LCD panel 55 cause images being picked up to be displayed on the LCD panel 55 as moving pictures on a real time basis. The photographer can confirm his or her shooting angle by real time images (through pictures) displayed on the LCD panel 55.

The camera 10 of this embodiment uses a transmissive type LCD panel 55, and a LCD backlight 56 and a backlight inverter block 60 are provided in the camera 10. The backlight inverter block 60 comprises a voltage switching circuit 62, an ON/OFF control switch 63 and an inverter circuit 64, and supplies required power to the backlight 56 in accordance with an inverter control signal from the MPU 30.

The display device that can be mounted on the camera 10 is not limited to the LCD panel 55 mentioned above, but may be some other display device capable of color displaying, such as an organic EL.

The signals for displaying generated by the image output processing unit 52 are also supplied to a video output terminal (VIDEO OUT) 67 via a video amplifier 66. By connecting an external display apparatus, such as a television monitoring apparatus, to the video output terminal 67, it is made possible to externally supply picture signals.

When the shutter release button 20 is pressed in the shooting mode, a start shooting instruction (release ON) signal is issued. The shutter release button 20 is a two-step switch including a switch S1 which is turned ON when half pressed and a switch S2 which is turned ON when fully pressed. The MPU 30, when it detects half pressing of the shutter release button 20 (S1=ON), performs automatic focusing (AF) control and automatic exposure (AE) control or, when it detects full pressing of the shutter release button 20 (S2=ON), starts CCD exposure and read control to take in images to be recorded.

The image processing unit 44, comprising a device which functions as an automatic arithmetic unit to perform computations needed for the automatic focusing (AF) control and automatic exposure (AE) control, performs evaluated focus value computation and AE computation on the basis of entered picture signals, and conveys the results of those computations to the system controller 46.

The system controller 46 is a system processing unit to take charge of system control, control of various data processing, and control of data communication with a personal computer and other external units, or the like in accordance with instructions from the MPU 30. The system controller 46 shifts the focusing lens of the photographic shooting system to an in-focus position, sets the iris to a proper count by controlling a drive device comprising a motor (not shown) on the basis of computation results received from the automatic arithmetic unit, and thereby controls the mechanical shutter and the duration of charge accumulation by the CCD 40 (electronic shutter). The system controller 46 also controls as required electric flash light emission in accordance with an instruction from the MPU 30.

Image data taken in as a response to the full pressing of the shutter release button 20 (S2=ON), after going through YC processing and other prescribed modes of processing by the image processing unit 44, are stored into the DRAM 48. The system controller 46 sends a command to a compression/expansion processing unit 70, and thereby causes the compression/expansion processing unit 70 to compress in a prescribed format (e.g., the JPEG format) image data (the luminance signals Y and chroma signals Cr and Cb) held on the DRAM 48. The compressed data are transferred from the DRAM 48 to a medium controller 71 and recorded on a recording medium 72 via the medium controller 71. The format of data compression is not limited to the JPEG format, but may be some other format, such as MPEG.

The device for storing image data in the camera 10 of this embodiment may be, for instance, a smart medium (Solid-State Floppy Disk Card). The recording medium 72 is not limited to this type, but it may instead be a PC card, compact flash, magnetic disk, optical disk, photomagnetic disk or memory stick. Many different kinds of media capable of reading/writing electronically, magnetically, optically or by a combination of some of these modes can be used. A signal processing and a medium controller 71 matching the medium to be used will be applied. The configuration may allow mounting of a plurality of recording media, whether of the same type or of different types. The medium may not necessarily be removable but may be a recording medium built into the camera 10 (internal memory).

By setting the camera 10 to the movie mode with the mode selector switch of the manipulating unit 32, it is enabled to record sound moving pictures. In the movie mode, pressing down the shutter release button 20 (S2=ON) starts the recording operation, and pressing the release button 20 again (S1=ON) stops the recording operation. The arrangement may as well be such that recording be continued while the shutter release button 20 is kept pressed down and stopped when it is freed from pressing.

Audio information during the recording of moving pictures is converted into voice signals by a microphone 74 built into the camera 10, and the signals are taken into the camera 10. The voice signals obtained from the microphone 74, after being amplified by an amplifier 75, are converted into digital signals by an A/D converter 76, and entered into a voice processing unit 78. The voice processing unit 78 performs processing to convert the entered voice signals into a prescribed signal format. Voice data generated by the voice processing unit 78, together with the video data of the moving pictures, are recorded onto the recording medium 72 in the motion JPEG format or any other prescribed recording format. The available recording format for moving pictures is not limited to the motion JPEG, but may be any other appropriate format, such as the MPEG format.

By setting the camera 10 to the voice recorder mode with the mode selector switch of the manipulating unit 32, voice recording with no picture shooting is made possible. In the voice recorder mode, full pressing of the shutter release button 20 (S2=ON) starts recording, and subsequent half pressing of the shutter release button 20 (S1=ON) stops recording. This prevents the manipulating noise of the shutter release button 20 from being recorded. Audio signals entered via the microphone 74 as described above acre converted by the voice processing unit 78 into a prescribed file format (e.g., the WAVE format), and recorded onto the recording medium 72 via the medium controller 71.

By setting the camera 10 to the playback mode, the most up-to-date file on the recording medium 72 (the last recorded file) is read out via the medium controller 71. If the played-back file is a still picture file, the compressed data of this picture file that has been read out are expanded into non-compressed YC signals via the compression/expansion processing unit 70.

The expanded YC signals are delivered to the image output processing unit 52 and, after being converted there into signals for displaying, supplied to the LCD panel 55 via the LCD driver 54. Incidentally, when an external display apparatus, such as a television monitoring apparatus, is connected to the video output terminal 67, the played-back picture is displayed on that external display apparatus. By manipulating either the right side segment or the left side segment of the cross-shaped key during such frame-by-frame displaying, the file to be played back can be switched.

Where the file to be played back is one of moving pictures, the leading frame of the moving pictures is displayed as the representative picture on the LCD panel 55, and the displayed picture will serve as the screen to accept an instruction to start playing back the moving pictures. Or where the file to be played back is a voice file (a voice file recorded in the voice recorder mode), a prescribed graphic symbol (e.g., a bit map background picture of a symbolically patterned microphone) indicating its being an voice file is displayed on the LCD panel 55, and the displayed picture will serve as the screen to accept an instruction to start playing back the voice recording. When an instruction to start playing back the voice recording is entered, the voice file is read out of the recording medium 72, and transferred to the voice processing unit 78. Audio signals generated by the voice processing unit 78, after being converted into analog signals by a D/A converter 80, are delivered to a loudspeaker 81 via the amplifier 75. The voice data so played back are supplied from the loudspeaker 81 as audible sounds.

Next will be described the audio playback function of the camera 10. This camera 10 is provided with a function to play back music files recorded on the recording medium 72 in the MPEG-1 Audio Layer-III (MP3) format or the like. It is supposed that the music file is downloaded onto the recording medium 72 by using a personal computer or a dedicated apparatus, such as a music delivery terminal. The camera 10 of this embodiment can download a music file from a personal computer or some other apparatus connected via the interfacing unit 38 for data communication, and record it onto the recording medium 72.

The camera 10 has remote control terminals including a voice output terminal (not shown), and a remote controller 85 with a headphone 84 can be plugged into this remote control terminal. The remote controller 85 has a switch unit comprising a manipulating unit for music selection, a playback/stop button, a forward/return button, a volume control button and so forth, an LCD panel for information displaying and an MPU for control use. When the switching unit is manipulated, an instruction signal according to the kind of manipulation is delivered to the system controller 46 of the camera 10.

The system controller 46 of the camera 10 performs processing matching an instruction signal received from the remote controller 85 (changing the object of playback, voice playback or the like). If the playback button of the remote controller 85 is pressed in a state in which the camera 10 is set in the audio mode, a music file will be read out of the recording medium 72 via the medium controller 71.

The compressed data of the music file read out of the recording medium 72 are expanded into non-compressed music data via the compression/expansion processing unit 70. These expanded music data are delivered to a decoder 88 via an audio processing unit 87 and, after being converted into required voice signals, are converted by a D/A converter 89 into analog signals, which are delivered to the headphone 84 via the remote controller 85. The music thereby played back is supplied through the headphone 84 as audible sounds. It is also possible to supply the played-back music through the loudspeaker 81 built into the camera.

Next will be described examples of control over the illuminants 22 in the camera 10 configured as described above.

1. EXAMPLES OF LIGHT EMISSION CONTROL WHEN POWER SUPPLY IS TURNED ON

Example 1-1

When power supply to the camera 10 is turned on, the illuminants 22 are lit either continuously or intermittently without using the operating mode for start-up (initial mode).

Example 1-2

The way of lighting the illuminants 22 is switched between continuous and intermittent according to the initial mode. When the camera is to be started up, for instance, in the shooting mode, the illuminants are lit continuously, or when it is started up in the playback mode, the illuminants are lit intermittently. Or else, the lighting color of the illuminants 22 may be changed according to the initial mode. In this case, it is also preferable to enable the user, for each different initial mode, to select from the menu on the camera body whether or not to change the displaying form of the illuminants 22 and to designate the displaying form.

Example 1-3

In Example (1-1) and (Example 1-2) described above, the duration of the lighting of the illuminants 22, either continuous or intermittent, can as well be set as desired, and control can be effected to turn them off after the continuous or intermittent lighting.

Example 1-4

It is preferable for the control pattern of the illuminants 22 when power supply is turned on in (Example 1-1) through (Example 1-3) described above to be selected by the user from the menu on the camera body and to be set as he or she likes.

Example 1-5

It is also preferable to display the remaining charge of the battery according to the number of illuminants 22 lit when power supply is turned on. If so configured, the MPU 30 of the camera 10 will acquire voltage information on the battery 35 to assess the remaining charge of the battery 35 and alter the displaying by the illuminants 22 according to the remaining charge. For instance, if the battery 35 is fully charged, all the three illuminants 22 will be lit. As the remaining charge drops with the continued use of the battery 35, the illuminants 22 will be successively turned off from that in the top position downward, and eventually all the illuminants 22 will be turned off. This arrangement will enable the remaining charge of the battery 35 to be displayed on a three-step scale.

Figure 5:
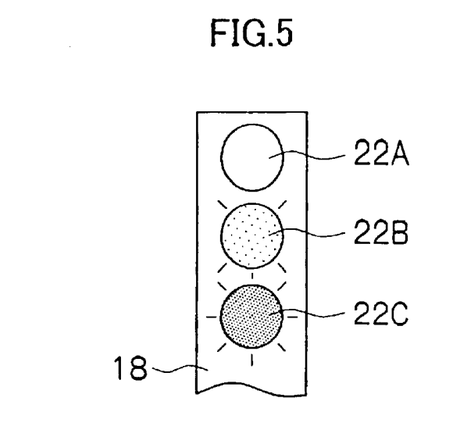
FIG. 5 illustrates an example of displaying the remaining battery charge on the luminous display unit of this example of camera.

It is also possible to display on a continuous scale the remaining charge of the battery 35 by controlling the luminance of each of the illuminants 22 when lit. An example of such displaying is shown in FIG. 5. Referring to FIG. 5, there is illustrated a state in which the illuminant 22A in the top position is off, the luminance of light emission by the illuminant 22B arranged in the middle is dimmed, and the illuminant 22C in the bottom position is lit. By sequentially turning off the illuminants 22A through 22C while dimming each of them from the state of being lit at its maximum luminance downward along with a decrease in the remaining charge of the battery 35, the remaining charge can be displayed in even more detail. Further, more displaying will be made possible by combining the state of intermittent light with luminance control at the time of their being lit.

To add, control can also be so effected that, after continuing the illuminating operations described with reference to (Example 1-1) through (Example 1-4) for a certain duration, an automatic shift to the battery remaining charge displaying in (Example 1-5) be carried out.

2. EXAMPLES OF LIGHT EMISSION CONTROL IN THE SHOOTING MODE

Example 2-1

When the release switch S1 is turned on in the shooting mode and AE and AF processing is completed to ready the camera for shooting, control is so effected as to turn on the illuminants 22 and thereby make it known that the camera is standing by for shooting. Then the illuminants 22 are extinguished by turning on the release switch S2 or disconnecting the release switch S1.

Example 2-2

The illuminants 22 are lit either continuously or intermittently during a zooming operation in the shooting mode. For instance, the number of illuminants is varied according to the zooming position. This would enable the person being photographed to be aware of the zooming operation.

Example 2-3

The illuminants 22 are lit either continuously or intermittently during self-timed shooting as a substitute for a tally lamp (self-timer lamp). In an alternative way of control, the number of illuminants lit can be sequentially reduced along with the countdown. The extra use of the illuminants 22 as a tally lamp in this manner could contribute to cost saving.

Example 2-4

The illuminants 22 can also be lit to provide an auxiliary light when AF control is to be performed under low illuminance. In this case, illuminants capable of emitting light of color and luminance suitable for use as an auxiliary light would be applied. The relative brightness of the object is measured with the CCD 40, an electric flash dimming sensor (not shown) or some other photometric sensor and, if the MPU 30 determines that the shooting would be done at lower illuminance than a prescribed reference level, the illuminants 22 will be turned on when effecting AF control. It is also preferable to effect control to switch to a form of displaying in which, when the action of such auxiliary light emission has enabled the AF control to be normally performed and made shooting possible, that possibility is expressed as described above with reference to (Example 2-1).

3. EXAMPLES OF LIGHT EMISSION CONTROL IN OTHER MODES

Example 3-1

Figure 6:
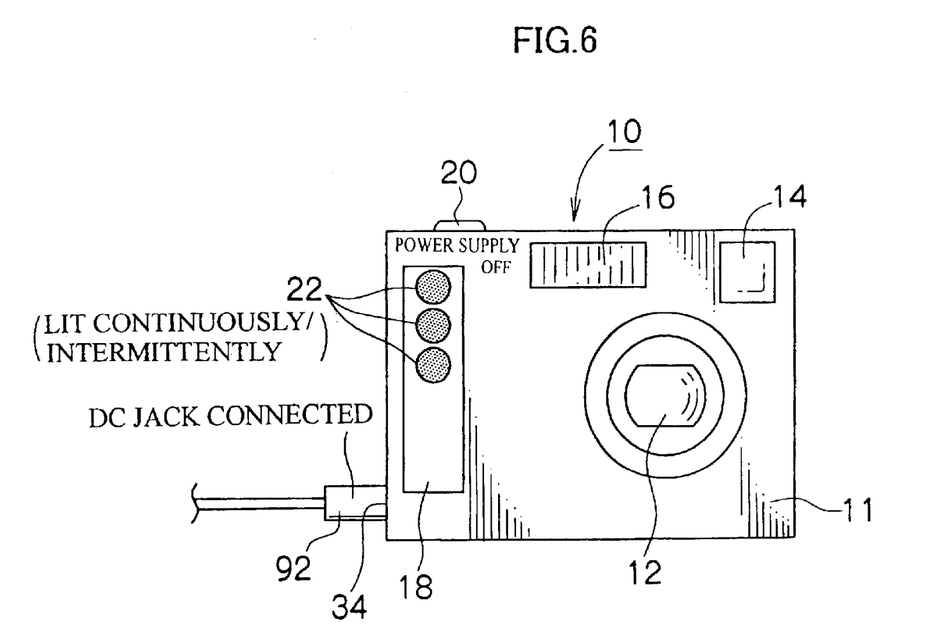
FIG. 6 illustrates a front view of the camera shown in FIG. 1 when its battery is being charged.

As shown in FIG. 6, when the battery 35 is to be charged by fitting the plug 92 of the connecting code of an AC power adaptor (not shown) into the DC input terminal (DC jack) 34 of the camera 10 at the time no power is supplied and using the charger circuit of the camera body to light the illuminants 22 either continuously or intermittently. During the execution of charging, the illuminants 22 are sequentially lit either continuously or intermittently according to the level of charge. For instance, the level of charge is made known by a displaying method reverse to the method of displaying the remaining charge of the battery described with reference to (Example 1-4) (i.e., a method by which the number of illuminants 22 lit or the luminance of their emitted lights are increased with the progress of charging). This extra use of the luminous display unit 23 as a battery indicator would enable the user to readily keep track of the progress of battery charging.

Example 3-2

Where the camera 10 is started up by fitting the plug 92 of the connecting code of the AC power adaptor (not shown) into the DC input terminal (DC jack) 34 of the camera 10 and using an external power source, the illuminants 22 are caused to emit light known by a displaying method different from when the battery is used (i.e., constant lighting). Since there is little need for displaying the remaining charge of the battery as described with reference to (Example 1-4) when an external power source is used, it is preferable to provide displaying to make it known instead that an external power source is being used.

Example 3-3

Another possible way of utilizing the illuminants 22 is, when the camera 10 is placed in the dark, to indicate its location by automatically lighting the illuminants 22 either continuously or intermittently. For instance, a photometric sensor such as an electric flash dimming sensor is used to measure the brightness of the ambience and, if it is determined that the brightness of the ambience is lower than a prescribed reference level, control is effected to light the illuminants either continuously or intermittently. This would enable the user to readily find the position of the camera 10 placed in the dark.

Example 3-4

It is also possible to utilize the illuminants 22 as an indicator of the voice input level in the voice recorder mode or the output level when playing back voice recording.

Thus, it is possible to display various states by varying, according to the state of the camera 10, the color, luminance, intervals of intermittence and the like of the lighting of the illuminants 22.

Another Preferred Embodiment

Next will be described another preferred embodiment of the present invention.

Figure 7:
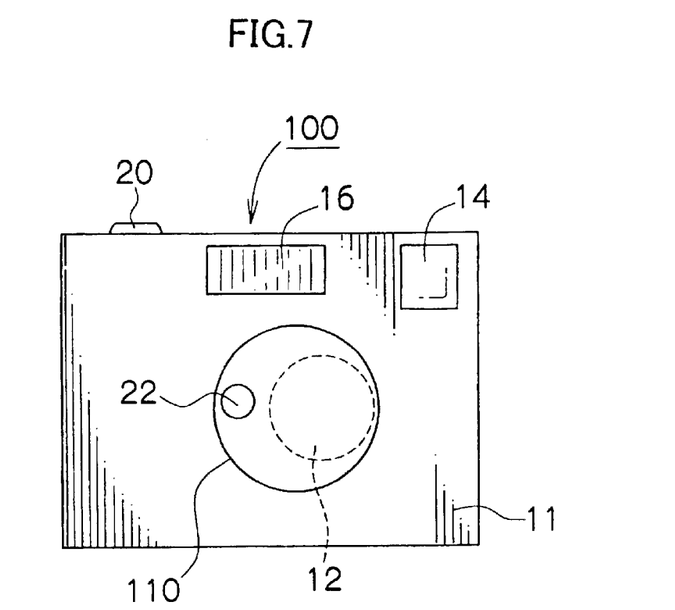
FIG. 7 illustrates a front view of an illuminant-equipped camera in another mode of implementing the present invention.
Figure 8:
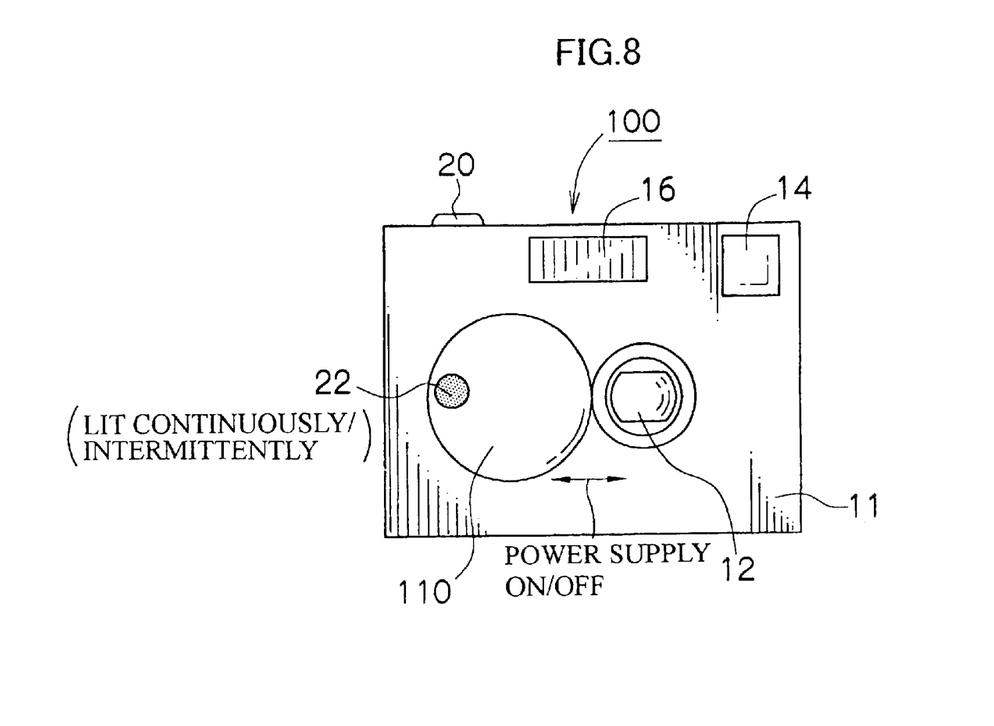
Figure 9:
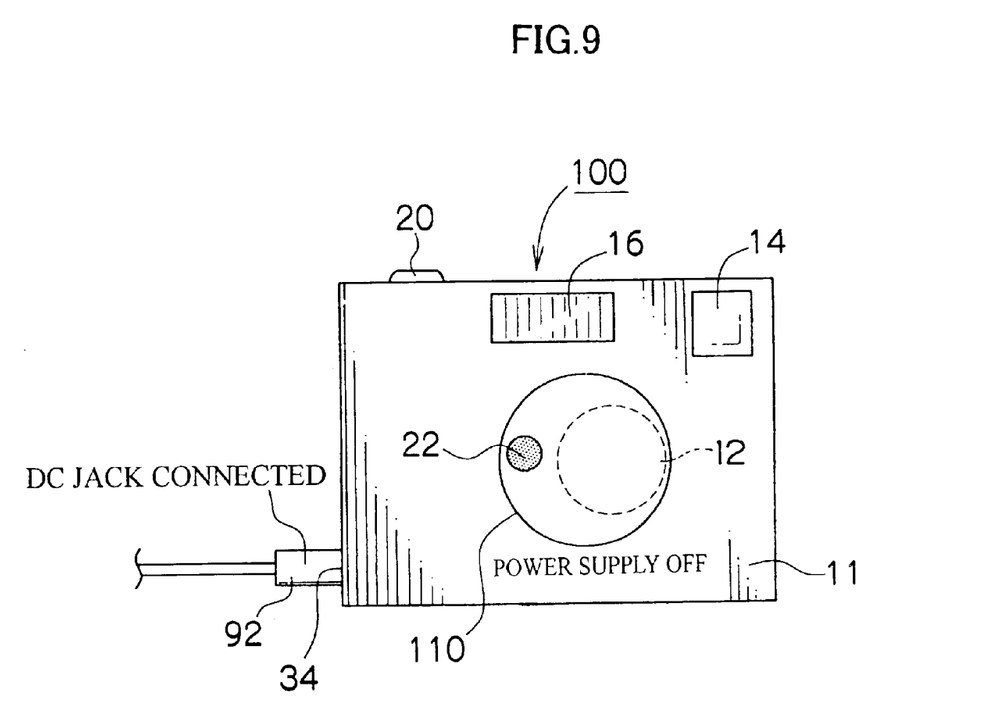
FIG. 9 illustrates a front view of the camera shown in FIG. 7 when its battery is being charged.

FIG. 7 through FIG. 9 shows front views of a camera 100 in another mode of implementing the invention. In these drawings, exactly or substantially the same parts as their counterparts in the camera 10 described with reference to FIG. 1 will be designated by respectively the same reference signs, and their description will be dispensed with.

The camera 100 shown in FIG. 7 is provided with a power switch member 110 which is also used as a lens barrier, and the illuminants 22 are provided directly on this power switch member 110. The power switch member 110 is structured to be slidable in any desired direction (up or down, right or left, or rotationally). For instance as shown in FIG. 8, the power switch member may be supposed to have a structure for sliding in the right and left directions in the drawing. As shown in FIG. 7, when the power switch member 110 is in a "barrier-closed position" to cover the front of the image pickup lens 12, power supply is off and the illuminants 22 are not lit. Alternatively, the lens barrier-cum-power switch member 110 is slid leftwards to a position where the image pickup lens 12 is exposed as shown in FIG. 8, power supply to the camera is turned on. In this state where power supply is on, the illuminants 22 are lit either continuously or intermittently.

Or even if power supply is off, where the battery is to be charged by fitting the plug 92 of the connecting code of the AC power adaptor (not shown) into the DC input terminal 34 as shown in FIG. 9, displaying is done to inform the user of the process of charging by lighting the illuminants 22 either continuously or intermittently.

Control methods which are the same as or similar to (Example 1-1) through (Example 3-4) described can as well be applied to light emission control of the illuminants 22 of the camera 100 illustrated in FIG. 7 through FIG. 9.

As hitherto described, according to the present invention, since illuminants are provided on the movable power switch unit itself and light emission control is so effected as to realize diverse forms of displaying according to the operating state of the camera, the efficiency of utilizing the space within the camera body can be improved over the conventional structure in which illuminants are accommodated within the camera body, and the user is enabled to readily keep track of the operating state of the camera. It is further possible to provide a camera which can not only display its operating state but also is improved aesthetically by the illumination effect of the luminous display unit.

In one mode of implementing the invention, as the luminous display unit includes a plurality of illuminants, and controls the number of lit ones among the plurality of illuminants is controlled according to the remaining charge or the state of charge of the power source battery of the camera, the user can readily keep track of the remaining charge of the battery or the progress of its charging.

Further according to another mode of implementing the invention, since the illuminants are provided on the power switch unit which is also used as the grip or the lens barrier of the camera, the arrangement of the illuminants is made easier, resulting in more efficient utilization of the space within the camera body.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An illuminant-equipped camera provided on a front face of its body with a movable power switch unit, wherein the power switch unit has a luminous display unit comprising at least one illuminant, and light emission from the illuminant is controlled according to a state of the camera.

2. The illuminant-equipped camera according to claim 1, wherein the luminous display unit comprises a plurality of illuminants, and a control circuit effecting light emission control over the illuminants controls a number of lit ones among the plurality of illuminants according to at least one of remaining charge and a state of charge of a power source battery of the camera.

3. The illuminant-equipped camera according to claim 1, wherein the power switch unit also serves as at least one of a grip and a lens barrier of the camera.

4. The illuminant-equipped camera according to claim 1, wherein the illuminant is lit when power supply to the camera is turned on.

5. The illuminant-equipped camera according to claim 1, wherein at least one of light emission form and lighting color of the illuminant is changed according to an operating mode of the camera.

6. The illuminant-equipped camera according to claim 1, comprising a device which variably sets duration of at least one of continuous and intermittent lighting of the illuminant.

7. The illuminant-equipped camera according to claim 1, comprising a device which sets a display pattern of the illuminant.

8. The illuminant-equipped camera according to claim 2, wherein the plurality of illuminants are arranged in a longitudinal direction of the camera, and the plurality of illuminants are sequentially lit from a bottom one and the number of lit ones among the plurality of illuminants is controlled in proportion to the remaining charge of the power source battery.

9. The illuminant-equipped camera according to claim 1, wherein the luminous display unit comprises a plurality of illuminants, and a control circuit effecting light emission control over the illuminants controls to light the illuminants in a predetermined display pattern when power supply to the camera is turned on, and controls a number of lit ones among the plurality of illuminants according to remaining charge of a power source battery of the camera after certain time elapses after the power supply to the camera is turned on.

10. The illuminant-equipped camera according to claim 1, wherein the illuminant is lit when ready of the camera for shooting is completed after a release switch is turned on.

11. The illuminant-equipped camera according to claim 1, wherein the illuminant is lit during a zooming operation of the camera.

12. The illuminant-equipped camera according to claim 1, wherein the illuminant serves as a self-timer lamp.

13. The illuminant-equipped camera according to claim 1, wherein the illuminant is lit to provide an auxiliary light under low illuminance.

14. The illuminant-equipped camera according to claim 1, comprising a power input terminal through which an external power source is connected, wherein when the external power source is used through the power input terminal, the illuminant is lit in a display pattern different from that under use of a power source battery of the camera.

15. The illuminant-equipped camera according to claim 1, comprising a device which measures brightness of ambience, wherein when it is determined that the brightness of the ambience is lower than a prescribed reference level, the illuminant is lit to show a position of the camera.

16. The illuminant-equipped camera according to claim 1, wherein the camera has a voice recording function, and the illuminant serves as an indicator to display at least one of a voice input level and an output level during playing back.

* * * * *